United States Patent [19]

Katoot

[11] Patent Number: 5,747,610
[45] Date of Patent: May 5, 1998

[54] POLYMER OPTICAL FIBERS AND PROCESS FOR MANUFACTURE THEREOF

[75] Inventor: Mohammad W. Katoot, Roswell, Ga.

[73] Assignee: KTH, LLC, Tucker, Ga.

[21] Appl. No.: 667,218

[22] Filed: Jun. 21, 1996

[51] Int. Cl.$^6$ .................................................. C08F 12/08
[52] U.S. Cl. .................... 526/73; 526/329.2; 526/329.7
[58] Field of Search ................................. 526/73, 329.2, 526/329.7

[56] References Cited

U.S. PATENT DOCUMENTS

| | | | |
|---|---|---|---|
| Re. 33,755 | 11/1991 | Downey et al. | 524/296 |
| 2,569,481 | 10/1951 | Lorand | 526/329.2 |
| 4,021,600 | 5/1977 | Anolick et al. | 528/484 |
| 4,210,567 | 7/1980 | Kösters | 260/31.8 R |
| 4,505,543 | 3/1985 | Ueba et al. | 350/96.34 |
| 4,571,313 | 2/1986 | Allemand et al. | 264/1.5 |
| 4,734,263 | 3/1988 | Gerking et al. | 422/135 |
| 4,891,075 | 1/1990 | Dakubu | 136/257 |
| 5,145,255 | 9/1992 | Shimada et al. | 366/329 |
| 5,217,518 | 6/1993 | Petisce | 65/10.1 |
| 5,245,057 | 9/1993 | Shirtum | 549/517 |
| 5,286,457 | 2/1994 | Woodson et al. | 422/135 |
| 5,443,775 | 8/1995 | Brannon | 264/143 |
| 5,466,535 | 11/1995 | Higgins et al. | 428/483 |
| 5,519,226 | 5/1996 | Copeland et al. | 250/390.11 |

OTHER PUBLICATIONS

"Graded–Index Polymer Optical Fiber For High Speed Data Communication", Ishigure, T. et al., *Applied Optics*, vol. 33, No. 19; pp. 4261–4266 (1994).

"Polymer Synthesis", Sandler et al., vol. 1., pp. 5–12, Second Edition, Academic Press, 1992.

*Primary Examiner*—Thomas R. Weber
*Attorney, Agent, or Firm*—Jones & Askew, LLP

[57] ABSTRACT

The present invention is an improved method for making fiber polymer optical fiber cable and graded index optical fibers. The polymer can be any shape including, but not limited to sheets, films or cable. The present invention also includes improved polymer optical fibers that incorporate compositions that shift the wavelength of radiation from ultraviolet radiation or X-ray radiation or infrared radiation to visible radiation.

29 Claims, No Drawings

POLYMER OPTICAL FIBERS AND PROCESS FOR MANUFACTURE THEREOF

TECHNICAL FIELD

This invention relates to an improved polymer optical fiber and a process for making the improved polymer optical fiber. The invention includes a graded index polymer optical fiber and a process for the manufacture of a graded index polymer optical fiber. The invention also includes an optical fiber or polymer that is capable of shifting the wavelength of the incoming electromagnetic radiation to another wavelength. This invention includes a method for chemical cleansing of radicals to produce high transparency polymers and a method by which polymer fibers can be made radiation hardened. The present invention includes a method to achieve very rapid polymerization of known monomers. The present invention also includes a method by which a rapid fast cast of polymers is achieved and the resulting preform rods can be drawn without the need for degassing.

BACKGROUND OF THE INVENTION

Plastic or polymer optical fibers have been produced in the prior art over the past several decades. However, the prior art methods of producing the optical fibers have produced fibers that are relatively inefficient with regard to transmission efficiencies, especially when compared to glass optical fibers.

For example, for long-range optical communication a single-mode glass optical fiber has been widely used, because of its high transparency and high bandwidth. In contrast, for short-range communication, recently there has been considerable interest in the development of polymer optical fibers. In short-range commnunications (such as local area network systems, interconnections, the termination area of fiber to the home, and domestic passive optical network concepts), many junctions and connections of two optical fibers are necessary. In a single-mode fiber, the core diameter is approximately 5–10 micrometers (μm), so when one connects two fibers, a slight amount of displacement, such as a few micrometers, causes a significant coupling loss. The polymer optical fiber is one of the promising possible solutions to this problem, because commercially available polymer optical fiber usually has a large diameter such as 1 mm. Therefore, low transmission loss and high bandwidth has been required for polymer optical fibers to be used as a short-distance communication media.

Most commercially available polymer optical fibers, however, have been of the step-index type. Therefore, even in short-range optical communication, the step-index polymer optical fibers will not be able to cover the whole bandwidth of the order of hundreds of megahertz (MHz) that will be necessary in fast datalink or local area network systems in the near future, because the bandwidth of the step-index polymer optical fibers is only approximately 5 MHz·km.

In contrast, graded-index polymer optical fiber is expected to have a much higher bandwidth than step-index polymer optical fibers, while maintaining a large diameter. Several reports of a graded-index polymer optical fiber have been made by Koike and collaborators (e.g., Ishigure, T., et al, "Graded-index polymer optical fiber for high-speed data commnunication" *Applied Optics Vol.* 33, No. 19 pp. 4261–4266 (1994)). However, the methods described in this paper are gel diffusion methods of producing graded index fibers and are cumbersome and expensive.

Traditional methods for making fiber optic polymers include producing fibers either by extrusion or by producing an extrudable preform rod to be drawn in a high temperature oven. In both methods, polymerization processes last for approximately 48 to 72 hours after which polymers are degassed for about 48 to 72 hours to ensure no monomer residuals or other solvents. The entire process may take from 4 to 6 days or longer, thereby hampering large scale production and increasing the possibility of introducing impurities which reduce optical transmission.

What is needed is a low cost and simple method of rapidly producing a graded index polymer optical fiber. What is needed is a method for rapidly producing preform rods with few impurities that does not require a degassing step. The method should produce a low-loss and high-bandwidth graded index polymer optical fiber and should include control of the graded refractive index and flexibility of the fiber. The fiber produced by this method should be flexible. In addition, the method should be easily adaptable to current manufacturing techniques of extruding polymer optical fiber.

SUMMARY OF THE INVENTION

The present invention provides for a low-loss and high-bandwidth optical fiber cable that is flexible, rapid, inexpensive, and simple to produce. The present invention also includes methods for producing a graded index optical fiber cable that is highly flexible. The present invention also provides a method for producing these fibers more quickly and economically than current methods.

For graded index optical fiber cable, the method of the present invention includes beginning with a cylinder of a homogeneous cladding polymer. The cylinder of cladding is inserted into a reaction chamber that is capable of being heated and rotated along its longitudinal axis. For example, the cladding can be a preformed silicone oligomer i.e., α,ω, dichloropropyldimethylsiloxane which has a refractive index of 1.42.

A monomer mixture of, for example, the above cladding and excess bisphenyl A polycarbonate with bisphenyl A pyridine methylene chloride solution is then added to the interior of the cladding either continuously or stepwise as the chamber is heated and rotated. Phosgene gas is also added continuously to the chamber as the preform rod is formed. As the copolymer polymerizes on the inner surface of the cladding the proportion of bisphenyl A polycarbonate to dimethylsiloxane can be varied to provide a copolymer with gradually changing refractive index. As the copolymer builds up on the inner surface of the cladding, the amount of polydimethylsiloxane decreases and the amount of bisphenyl A polycarbonate increases until the preform rod is filled in. The preform rod can then be removed from the reaction chamber and used in a conventional extrusion apparatus to manufacture optical fiber.

Another monomer mixture that can be used in practicing the present invention is styrene, methyl methacrylate, and a monomer that polymerizes with lower surface energy polymers, such as fluorinated monomers or siloxane. While not wanting to be bound by the following hypothesis, it is believed that during polymerization, low surface energy polymers migrate outwards, and that the refractive index profile of the preform rod is controlled by the temperature conditions.

The present invention also includes a method for increasing the clarity of the polymer optical fiber by the addition of free radical scavengers such as dibutyl-1-phthalate at a concentration of approximately 0.5% by volume. Other free radical scavengers that can be added to the polymer in the process of producing the preform rod include, but are not limited to, propanol, cyclohexane and butylnitrile. Other agents that can be used to increase the clarity of the polymer optical fiber include, but are not limited to, a variety of low temperature glass transition small molecules, such as siloxane oligomers and different Lewis acids.

The resulting fibers can easily be bundled together and fused by placing the bundle in a container and applying a vacuum to the bundle. The temperature is raised to the glass transition point of the cladding. The bundle is then allowed to cool. The process is desirably repeated four to five times resulting in a uniform bundle of fibers.

Finally, the present invention includes additives that can be added to any conventional optical fiber and the optical fibers of the present invention that are capable of very large wavelength shifts between the incoming and exiting radiation.

Accordingly, it is an object of the present invention to provide a graded index polymer fiber optical cable.

It is an object of the present invention to provide a low-loss and high-bandwidth graded index polymer fiber optical cable.

It is further an object of the present invention to provide a method of rapidly manufacturing a flexible, graded index polymer fiber optical cable.

It is further an object of the present invention to provide a method of manufacturing a fused bundle of graded index polymer fiber optical cable.

It is yet another object of the present invention to provide preform rods can be produced rapidly in comparison to previously known methods that require much more time.

It is yet another object of the present invention to provide preform rods that can be produced without application of vacuum or a degassing step as required by conventional methods, thereby speeding production of preform rods that are ready to be pulled into fibers.

It is yet another object of the present invention to provide an optical polymer suitable for use as a film, gel or fiber optical cable, that is capable of large shifts in wavelength between the incoming and exiting electromagnetic radiation.

It is yet another object of the present invention to provide polymers containing the wavelength shifters can be made in different forms and shapes, and incorporated into radiation surveillance equipment, radiation detectors, and industrial and recreational clothing.

It is another object of the present invention to provide polymers containing the wavelength shifters can be used for viewing of X-ray, ultraviolet, or infrared radiation as visible radiation. The present invention also includes the shifting of visible radiation to X-ray, ultraviolet, or infrared radiation It is another object of the present invention to provide polymers containing the wavelength shifters used for viewing of X-ray, ultraviolet, and infrared radiation as visible radiation and to provide the ability to visualize previously invisible radiation in real time and at reduced levels of the incident radiation presently required for visualizing objects, thereby decreasing radiation exposure of patients and health care professionals.

Another feature of the optical polymer fibers of the present invention is that they provide the ability to magnify images with high resolution.

It is another object of the present invention to provide a polymer fiber optical cable suitable for use in endoscopic instruments.

It is another object of the present invention to provide optical fibers that are are very flexible.

These and other objects, features and advantages of the present invention will become apparent after a review of the following detailed description of the disclosed embodiments.

DETAILED DESCRIPTION OF THE INVENTION

This following patent applications are herein incorporated by reference in their entirety; provisional U.S. patent application Ser. No. 60/003,694 filed on Sep. 13, 1995, now abandoned, and U.S. patent application Ser. No. 08/594,711 filed on Jan. 31, 1996, now pending.

The term "prepolymer composition" includes monomers and oligomers that can be used to make a polymer with desired physical characteristics. The term "preform rod" as used herein, means the polymer rod that is produced in the polymerization vessel according to the present invention. The term "wavelength shifting additive" as used herein, means any additive that is capable of adding the capability of a polymer to change the wavelength of electromagnetic radiation transmitted through the polymer. The wavelength shifting additive is preferably added to the prepolymer mixture before polymerization. The term "patient", as used herein, means any human or animal. The term "health care professional", as used herein, means any person engaged in the provision of health care to a patient and includes, but is not limited to the following: physicians including radiologists, gastroenterologists, nuclear medicine physicians, and oncologists; nurses including nuclear medicine nurses; technicians including radiological technicians, gastroenterology technicians, neurological technicians; veterinarians and their assistants; dentists, dental assistants; and speech pathologists. The term "research professional", as used herein, means any person engaged in research who may be exposed to radiation including, but not limited to, the following: scientists; laboratory technicians; students; and postdoctoral fellows.

The term "relative percentage" indicates the amount of one ingredient divided by the amount of another ingredient times 100. Accordingly, if substance X were present at twice the concentration of substance Y, the relative percentage of X to Y would be 200% expressed as relative percentage of X to Y=(X/Y) times 100.

The present invention provides for a low-loss and high-bandwidth graded index optical fiber cable that is inexpensive and simple to produce. The present invention also includes a method of producing the graded index optical fiber cable that is rapid. The method of the present invention produces a fiber that is extremely flexible. The present invention provides a method for producing an optical fiber of desired flexibility.

The present invention can be used to produce graded index optical fiber cable from a variety of monomers including, but not limited to, the monomers listed in Table I. The refractive index is indicated as $n_D$.

TABLE I

| Monomer | $n_D$ of polymer |
|---|---|
| methyl methacrylate | 1.49 |
| ethyl methacrylate | 1.483 |
| n-propyl methacrylate | 1.484 |
| n-butyl methacrylate | 1.483 |
| n-hexyl methacrylate | 1.481 |

TABLE I-continued

| Monomer | $n_D$ of polymer |
|---|---|
| isopropyl methacrylate | 1.473 |
| isobutyl methacrylate | 1.477 |
| tert-butyl methacrylate | 1.463 |
| cyclohexyl methacrylate | 1.507 |
| benzyl methacrylate | 1.568 |
| phenyl methacrylate | 1.57 |
| 1-phenylethyl methacrylate | 1.549 |
| 2-phenylethyl methacrylate | 1.559 |
| furfuryl methacrylate | 1.538 |
| methyl acrylate | 1.4725 |
| ethyl acrylate | 1.4685 |
| n-butyl acrylate | 1.4634 |
| benzyl acrylate | 1.5584 |
| 2-chloroethyl acrylate | 1.52 |
| vinyl acetate | 1.47 |
| vinyl benzoate | 1.578 |
| vinyl phenylacetate | 1.567 |
| vinyl chloroacetate | 1.512 |
| acrylonitrile | 1.52 |
| α-methylacrylonitrile | 1.52 |
| methyl-α-chloroacrylate | 1.5172 |
| atropic acid, methyl ester | 1.560 |
| o-chlorostyrene | 1.6098 |
| p-fluorostyrene | 1.566 |
| o,p-difluorostyrene | 1.475 |
| p-isopropyl styrene | 1.554 |
| 2,2,2-trifluoroethyl acrylate | 1.37 |
| 2,2,2-trifluoroethyl methacrylate | 1.39 |
| α, dichloropropyl-dimethylsiloxane | 1.42 |

Prepolymer compositions which are useful in the practice of this invention, include such polymers as polycarbonates (such as those sold by General Electric Company, Schenectady, N.Y., under the trademark LEXAN™), polyesters, polyolefins, acrylic polymers (such as those sold by Cyro Industries under the trademark ACRYLITE™) and other thermoplastic polymers. Another example of a suitable acrylic polymer is polymethyl methacrylate. Other polymers which may be used in the present invention include, but are not limited to, halide-terminated organosiloxanes such as chlorine-, bromine-, and fluorine-terminated organosiloxanes, alkoxyfunctional siloxanes with an alcoholic split (i.e., an OH side group), hydroxy terminated polymer borates, dihydric phenol with readily removable ammonia groups, and diphenol propane bischloroformate.

The present invention is especially useful for producing graded index polymer optical fibers with specialized, non-linear graded index cross-sections. Additives can be incorporated into the graded index polymer optical fibers of the present invention to provide useful effects. For example, wavelength shifters can be added to shift wavelengths of electromagnetic radiation transmitted through the fiber. By choosing the proper polymers, the flexibility of the graded index polymer optical fibers can be adapted to a particular use. For example, in the present invention, the relative percentage of methylmethacrylate to styrene may be varied from 10% to 400% to change the flexibility and refractive index of the polymer fiber. When the relative percentage of methylmethacrylate to styrene is about 50%, the resulting fibers exhibit great flexibility.

The present invention is also useful in producing single mode optical fibers that can be used for visual transmission of images. These fibers are particularly useful for endoscopic devices. By using the fibers according to the present invention, the optical fibers can replace expensive glass fibers with little or no reduction in the clarity of the transmitted image.

For example, the process of adding the copolymer is adjusted so that the final polymer added is bis phenyl A polycarbonate or other phenols listed in Table 1 which have a refractive index of less than or equal to 1.58. The resulting preform rod is a graded index rod with an index of 1.42 on the surface which gradually increases to 1.58 at the center of the preform rod. The rod can then be heat-drawn using conventional extrusion techniques to provide a graded index polymer optical fiber. It is important to note that, according to the present invention, the change in refractive index from the outer surface of the preform rod, and therefore the resulting optical fiber, can be linear, non-linear, or even stepped, depending upon the manner in which the polymers are added to the cylinder. To produce a single mode optical fiber, a single concentration of a polymer or mixture of polymers is used in the synthesis of the preform rod. To produce a graded index optical fiber, two or more polymers are used.

In one embodiment, the present invention includes the rapid formation of flexible optical fibers as set forth in Examples 1 through 4. The various monomers are mixed together and then heated. By adjusting the ratio of methyl-methacrylate to styrene, the flexibility of the fiber can be adjusted. Also, by employing N,N-dimethylaniline and tetrabutyl ammonium fluoride tetrahydrate (TAFT) which is in methanol, higher molecular weight polymers may be formed as shown in Example 2. Using TAFT in methylmethacrylate and N,N-dimethylaniline as described in Example 3 produces fibers with increased flexibility, and higher molecular weight polymers that are formed more rapidly than the fibers formed by the process of Example 1. It is believed that the N,N-dimethylaniline and TAFT speed polymerization and increase the molecular weights of the resulting polymers in the fibers. It is to be understood that some of the chemicals recited in these Examples may be changed in the practice of the present invention. In Example 4, for instance, it is also possible to use mercurate chloride and mercuric oxide instead of mercuric-2-chloride in the practice of this method of the present invention. The temperature conditions recited in Examples 1 through 4 may also be modified in the practice of the present invention.

Briefly, one embodiment of the present invention includes the formation of a graded index polymer on the inside surface of a tube of cladding polymer. The refractive index of the cladding polymer is a sufficiently lower than that of the core polymer, and is desirably less than 1.43, and preferably less than 1.415. As the refractive index decreases, the maximum possible light incident angle increases. Additional properties necessary for the cladding polymer are high transparency, mechanical strength, heat resistance and adhesiveness to the core. In the graded index fiber, the cladding is the copolymer itself.

The refractive index gradient is formed by using two or more different monomers or oligomers and reacting those monomers or oligomers while varying the ratio of the concentration of the monomers or oligomers as the preformed rod is being formed. In this way, a smooth gradient is formed from the inner surface of the cladding to the center of the preformed rod. The preformed rod can then be heat drawn to form the fiber. In the present invention, the relative percentage of methylmethacrylate to styrene may be changed depending on the desired refractive index. Furthermore, as described in Example 5, the amount of 2,2,2-trifluoroethyl methacrylate or 2,2,2-trifluoroethyl acrylate which is added may vary between approximately 1 wt % and 20 wt % depending on the desired profile of refractive index of the fiber. In addition, the rate of temperature increase described in Example 5 may be altered to affect the graded index characteristics of the fiber.

The monomers and all of the required reactants should preferably be cleaned by the use of, for example, ultrafilters capable of removing fine particles having sizes of 100 Å or more. Monomers are cleaned in two consecutive processes: first, monomers are washed with appropriate solvents (such as water) and then dried with anhydrous or nonaqueous solvents. Then, the monomers can optionally be vacuum distilled before introduction into the polymerization chamber. A polymerization chamber which may be used in the practice of the method of this invention is described in U.S. patent application Ser. No. 08/594,711 filed on Jan. 31, 1996, now pending, which is incorporated herein by reference in its entirety.

In one embodiment of the present invention, the prepolymer compounds are mixed in a mixing vessel by introducing the various prepolymer compounds via the input ports to the mixing vessel. Once the prepolymer compounds are delivered to the mixing vessel, they can be injected directly into the polymerization vessel via an injection system. The polymerization vessel is then heated to the desired temperature and the prepolymer mixture is injected into the polymerization vessel at the desired rate through the injection and outlet system. At another inlet, preferably at the other end of the polymerization vessel, an initiator, such as phosgene, is added via injection. This process continues until the polymer is formed filling the polymerization vessel. It is to be noted that the mixture of prepolymer compounds can be added at various rates thereby changing the ratio of the prepolymer components in the final polymer as the polymer is formed in the polymerization vessel. In this way, a graded index preform polymer can be easily produced and the ratio of the prepolymer compounds can be varied in any way to form a preformed polymer with the desired index changes from the cladding to the center of the preformed polymer.

After the preformed rod is formed, the rod is removed from the polymerization vessel and can be extruded by means well known to those of ordinary skill in the art to form a polymer fiber.

In another embodiment of the present invention, the preform graded index polymer can be rapidly produced in a single step. The various monomers are mixed together and then heated. During the polymerization process, by adjusting the rate of temperature increase or decrease, the refraction index profile of the preform rod can be adjusted to any desired profile. In the embodiment described in detail in Example 5, styrene and methylmethacrylate are mixed. The relative percentage of methylmethacrylate to styrene can be between approximately 10% and 500% with a desired relative percentage of between 40% and 400% with the most desired ratio of between approximately 80% and 400%.

Polymerizing promoters, such as dibenzyl peroxide are then added. It should be noted that the refraction index profile can be determined by the ratio of monomers in the initial mix. Next, 2,2,2-trifluoroethyl methacrylate (1–20% wt %) or 2,2,2-trifluoroethyl acrylate (1–20% wt %) is added and mixed with the other reagents. The mixture is then placed in a vacuum oven under nitrogen at 50° C. for several hours. The temperature is then gradually increased depending on the percentage of polymer desired and the profile of the desired refractive index. Desirably, the rate of temperature increase is approximately 10° C. per 30 minutes until 100° C. is attained. Then the temperature is increased to 130° C. for 1 hr and the procedure is finished. Increasing the temperature rapidly will cause the refractive index change to be greatest near the surface of the preform rod. Increasing the termperature slowly will cause a more linear refractive index change. Other temperature profiles can be used in practicing the present invention depending upon the refractive index profile desired. This embodiment has the advantage of producing a graded index polymer fiber in a single reaction in a relatively short period of time. No mechanical manipulation of the reaction mixture is required.

The graded index polymer optical fibers of the present invention are particularly suited for short-distance communication applications such as local area networks (LANs), datalinks, and multinoded bus networks, because their easy processing and large diameters enable high efficiencies of fiber coupling and beam insertion. The graded index polymer optical fibers of the present invention have a much higher bandwidth (>500 MHz·km) than that of a multimode step index polymer optical fibers (2–5 MHz·km).

The present invention also includes a method for increasing the clarity of the polymer optical fiber by the addition of free radical scavengers such as dibutyl-1-phthalate at a concentration of approximately 0.5% by volume. Other free radical scavengers that can be added to the polymer in the process of producing the preform rod include, but are not limited to, propanol, cyclohexane and butylnitrile. Other agents that can be used to increase the clarity of the final fiber include, but are not limited to, a variety of low temperature glass transition small molecules, such as siloxane oligomers and different Lewis acids. It is to be understood that the agents that can be used to increase the clarity of the final fiber can be used alone or in any combination. Desirably, the concentration of the clarity agent should between approximately 0.01 to 2% by weight with the more desirable concentration between approximately 0.1 to 1% with the most desirable concentration of approximately 0.5% by weight.

The present invention also includes additives that are capable of shifting the wavelength of electromagnetic radiation as the radiation passes through a polymer containing the additives. The additives can be used in any polymer or polymer fiber. The additives are unique in that they are capable of producing very large shifts in radiation wavelength. For example, certain of the additives can shift the wavelength of the incoming electromagnetic radiation from the ultraviolet range to the visible range. Another of the additives can shift infrared electromagnetic radiation to visible radiation. Yet another of the additives is capable of shifting X-ray electromagnetic radiation to visible. The additives of the present invention are capable of shifting electromagnetic radiation over a wavelength range of 200 nm. For example, the additive described in Example 6 is capable of shifting the wavelength of ultraviolet electromagnetic radiation at a wavelength of 250 nm to visible radiation observed as green light at a wavelength of approximately 420 nm.

Although not wanting to be bound by the following hypothesis, it is believed that the wavelength shift is due to an intramolecular proton shift. The additives are generally polymers that are in a "ladder" configuration with crosslinkers comprising aromatic moieties that are capable of donating and accepting protons when exposed to electromagnetic radiation. It is believed that the shift of the protons causes a shift in the wavelength of the electromagnetic radiation.

The present invention can also be applied to a film for a variety of applications involving various kinds of imaging processes, all of which are considered within the scope of the present invention. Conventional radiographic procedures involve the passage of X-rays through an object to produce an image composed of white, black and various shades of gray depending on the radiodensity of the object. This image is usually captured on a film which is subsequently developed and fixed in film processing machines employing various chemicals. The present invention is very sensitive to electromagnetic radiation and can be employed with substantially less incident radiation (approximately 25%) of the radiation normally required to produce a radiograph. A film coated with the present invention and exposed to X-rays produces a color image without the need to capture the image and convert it to color through intermediate means such as a computer. Using the present invention, a health care professional, for example, could easily obtain a color image of a damaged limb following exposure of the limb to X-rays. This color image could be obtained using only about 25% of the incident radiation normally required to produce a radiograph, thereby significantly decreasing direct and reflected radiation exposure to the patient and the health care professional. Reduced radiation levels also decrease the amount of lead shielding required, thereby reducing the weight of shielding screens and garments, and decreasing associated occupational injuries such as low back strain due to the necessity of wearing heavy lead aprons. Furthermore, this color image could be viewed soon after exposure to the X-rays, thereby decreasing time delays in processing films, reducing costs involved with the purchase of radiographic print development equipment and supplies, and reducing the cost of disposal of toxic chemicals associated with radiographic development.

The coated film of the present invention is also useful in the imaging of fluorographic procedures. Various fluorographic procedures, such as mannofluorography, involve the continuous exposure of the patient to X-ray radiation, and produce a black and white image of the differential radiodensity of the patient. These images are often stored on a tape and viewed as a continuous image. In this procedure, a radiocontrast material, such as barium, is observed as it moves within the subject. For example, after swallowing a bolus of barium, a health care professional may watch the barium travel from the mouth into the oropharynx, esophagus and stomach. Use of the present invention would provide an on-line color image of the patient while significantly reducing the radiation exposure of both the patient and the health care professional since substantially less incident radiation is required. This invention is useful in a variety of similar radiologic procedures including, but not limited to the following; upper and lower gastrointestinal series, arteriograms, pneumograms, intravenous pyelograms, lymphangiography, choleangiography, myelograms, and other procedures. This invention is also useful in the fields of nuclear medicine and radiation oncology where preparation and use of radiation in the form of medicine, or focused application of radiation for therapeutic reasons is common.

The use of this invention in other imaging procedures is also considered within the scope of this invention. These imaging procedures include any procedure wherein some form of electromagnetic radiation is applied to a patient, including but not limited to the following procedures, magnetic resonance imaging (MRI), computer assisted tomography (CRT or CAT), positron emission tomography (PET), and improvements thereof.

In addition to patients and other living animals and plants, other objects receiving radiation exposure may be inanimate. At this time, security measures in airports include radiographic analysis of luggage, coats, bags, etc. Use of the films of the present invention incorporating wavelength shifters would substantially decrease the level of required incident radiation to approximately 25% of current levels thereby providing reduced radiotoxicity and decreasing shielding costs, while also providing on-line color images which might facilitate identification of suspicious articles.

The present invention may be applied to improvements in radiation surveillance equipment. For example, radiation badges are worn by many individuals, especially research professionals, health care professionals and those individuals involved in nuclear facilities or in industries involving the use of radiation. These badges must be developed to provide a post facto assessment of the degree of radiation exposure of an individual. Use of the wavelength shifting additives of the present invention incorporated in a film badge would provide an immediate visible color indication of the extent of radiation exposure without the need for badge development using conventional means such as chemical developers and fixers. This capability is especially useful during procedures involving relatively high levels of radiation such as radioiodinations, or preparation of radioactive therapeutic formulations. Film badges incorporating the films of the present invention could be worn at any location desired for radiation surveillance, such as on the fingers, belt and lapel.

The films of the present invention could also be incorporated into suits for astronauts and for employees in the aeronautics, aerospace and nuclear industries who are exposed to high levels of radiation. The films of the present invention could also be incorporated into the cockpits and windshields of airplanes which are exposed to high levels of radiation in the upper levels of the atmosphere. These films of the present invention may be incorporated into badges or into the clothing of employees in the aviation industry such as pilots, flight engineers, stewards and stewardesses who are exposed to increased levels of radiation during flight. Other industrial employees would benefit from the present invention including, but not limited to, those exposed to higher levels of solar radiation in industries such as construction, transportation, agriculture, shipping, petroleum, and recreation.

The films of the present invention may be incorporated into recreational clothing and equipment, including, but not limited to visors, caps, sunglasses, swim suits, sports uniforms, umbrellas, blankets, towels and chairs so that individuals may accurately monitor their exposure to solar radiation, thereby decreasing the incidence of sunburns and various forms of skin cancer, especially melanoma, which have increased dramatically in recent years and are projected to increase further in the near future.

Another item of radiation detection equipment that may incorporate the present invention involves small pieces of film attached to cotton swabs, filter paper, towelettes or wipes for use in radiation surveillance wipe tests performed to determine if a radioactive spill has occurred. The present invention would eliminate the need for measuring the radioactivity of conventional pieces of filter paper in a gamma counter since the papers with attached film that become radioactive or transmit radiation would instantly change color. This invention would save time and money in unnecessary counting of wipe tests in gamma counters, thereby increasing availability of gamma counters for use in assays, and provide instant results. The film of the present invention could also be incorporated into sheets of laboratory benchtop paper so that radioactive spills could be visualized immediately during a procedure, such as a radioiodination, thereby alerting the individual to the danger so that corrective procedures may be initiated. This invention is especially useful to research professionals and health care professionals.

The films of the present invention may also be used in the separations sciences. The film can provide a color print of radiolabelled bands on gel used for separating molecules including, but not limited to proteins, nucleoproteins, and nucleic acids, thereby indicating the location of various radiolabelled molecules and obviating the need for apposition of conventional photographic films and their development. The film may be used to monitor the passage of radiolabelled materials through chromatographic columns. This film may also provide a color print of bands on gels that contain ethidium bromide or other markers that are activated by electromagnetic radiation, such as ultraviolet radiation, and emit electromagnetic radiation in the form of ultraviolet radiation. The sensitive films of the present invention permit the use of significantly lower amounts of toxic dyes such as ethidium bromide that are required to visualize bands upon UV exposure.

The present invention may also be incorporated in detection systems that measure radiation output, such as gamma counters, scintillation counters, and spectrophotometers.

The films of the present invention can also be used in applications involving imaging of radiation based phenomena such as radiation emitted from stars, nuclear facilities, nuclear storage facilities, nuclear test sites, from shipment canisters and containers for radionuclides. For example, incorporation of the film of the present invention into the canisters used to ship radionuclides might warn the user of the isotope before opening the canister and risking exposure to concentrated doses of radioactivity if there has been contamination of the canister. This application eliminates the need for time consuming radioactive surveillance "wipe tests".

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims. Unless otherwise indicated, all chemicals are obtained from Aldrich Chemical Company, Milwaukee, Wis.

EXAMPLE 1

About 50 g of styrene (100% distilled) is added to 50 g methylmethacrylate (100% distilled). Next the following reagents are added in any order to the styrene: methylmethacrylate mixture:
dibenzyl peroxide (1 to 2% weight (wt) %); dodecylmercaptan (1% wt % of a 100% distilled stock); and butyl thiophene (0.5% wt % of a 100% distilled stock). The mixture is heated in the following manner: first to 100 C. for about 3 hours (hr), followed by 120° C. for about 3 hr; 150° C. for about 2 hr and finally at 85° C. for about 12 hr. In this and subsequent examples, the mixture is heated under nitrogen atmosphere in a vacuum oven without the application of a vacuum.

EXAMPLE 2

About 50 g of styrene (100% distilled) is added to 50 g methylmethacrylate (100% distilled). Next, the following reagents are added in any order to the styrene: methylmethacrylate mixture:
dibenzyl peroxide (1 to 2% wt %); dodecylmercaptan 1% wt % of a 100% distilled stock); and butyl thiophene (0.5% (wt %) of a 100% distilled stock).

Next add N,N-dimethylaniline (1 % wt %) of a distilled stock) and 1.0% (wt %) tetrabutyl ammonium fluoride tetrahydrate (TAFT) which is at 10% (wt %) in methanol. It is believed that the N,N-dimethylaniline and TAFT speed polymerization and increase the molecular weights of the resulting polymers in the fibers.

The mixture is heated in the following manner: first to 100 C. for about 3 hr, followed by 120°C. for about 3 hr; 150° C. for about 2 hr and finally at 85° C. for about 12 hr. Polymerization occurs in about 10 hr and the molecular weights of the resulting polymers are higher than in Example 1.

EXAMPLE 3

The same procedure is used as in Example 2 except that the 1.0% (wt %) TAFT which is added to 25 g of styrene and 75 g of methylmethacrylate is in 10% (wt %) methylmethacrylate. N,N-dimethylaniline (1% (wt %) of a distilled stock) is added. The heating conditions are the same as recited in Example 2.

The resulting fibers show increased flexibility, contain higher molecular weight polymers and are formed more rapidly than the fibers formed by the process of Example 1.

EXAMPLE 4

The same materials are used as in Example 3 except that N,N-dimethylaniline is not employed. Mercuric-2-chloride (0.5–1.0% (wt %)) in a solution of methanol (10% wt %) is added and the mixture is heated at 100° C. for 30 minutes. The mixture is then allowed to cool. After 20 minutes, the procedure may be stopped at room temperature. At this time, the material is in the form of a viscous semi-polymer and it may be drawn continuously to polymerize. Nitrogen gas pressure may be used to push the viscous material out of the vessel into the desired shape, although any extrusion apparatus may be used to push the material out of the reaction vessel. The resulting fibers do not discolor, are flexible and draw into fibers very easily. The process described in this Example provides a rapid rate of polymerization and the capability to make higher molecular weight polymers.

It is also possible to use mercurate chloride and mercuric oxide instead of mercuric-2-chloride in the method described in this Example.

Example 5
Graded Index Fiber

About 50 g of styrene (100% distilled) is added to 50 g methylmethacrylate (100% distilled). Next the following reagents are added in any order to the styrene: methylmethacrylate mixture:
dibenzyl peroxide (10% wt %); dodecylmercaptan (1% wt % of a 100% distilled stock); and butyl thiophene (0.5% wt % of a 100% distilled stock). The amount of styrene that is added is varied depending on the desired refractive index. Next, 2,2,2-trifluoroethyl methacrylate (1–20% wt %) or 2,2,2-trifluoroethyl acrylate (1–20% wt %) is added and mixed with the other reagents. The mixture is then placed in a vacuum oven under nitrogen atmosphere at 50° C. for 2 hr. No vacuum is applied to the vacuum oven. The wt % of 2,2,2-trifluoroethyl methacrylate or 2,2,2-trifluoroethyl acrylate which is added may vary between (1–20% wt %) depending on the desired profile of refractive index of the fiber. In the present example, 10% (wt %) 2,2,2-trifluoroethyl methacrylate was used. Next the temperature is gradually increased depending on the percentage of polymer desired and the profile of the desired refractive index. The rate of temperature increase is approximately 10° C. per 30 minutes until 100° C. is attained. The rate of temperature increase may be altered to affect the graded index characteristics of the fiber. Then the temperature is increased to 130° C. for 1 hr and the procedure is finished.

EXAMPLE 6

Wavelength Shifting Composition A wavelength shifting composition is prepared by the following protocol. Five g of piperonal and 5 g of cyanoacetate are mixed with 0.8 mL of piperidine. The mixture is then dissolved in 100 mL of toluene. Five g of molecular sieves (Aldrich) is added to the solution. The mixture is heated at 70° C. for 6 hr. The mixture is then filtered through filter paper to remove the molecular sieve. The mixture is then cooled and the toluene is removed by evaporation to yield a powder. The powder can be dissolved in benzene at a concentration of 1 g/mL. The concentration of powder in the benzene can vary depending upon the amount of wavelength shifter needed in the final polymer matrix.

Various amounts of the benzene solution are added to a conventional methyl methacrylate prepolymer and the solution is polymerized according to conventional reaction protocols well known to those of ordinary skill in the art. (See, for example, "Polymer Synthesis", Sandler et al., Vol. 1, pp. 5–12, second edition, Academic Press, 1992) The amount of benzene solution can vary depending upon the fluorescence amplitudes needed. The resulting polymer is drawn into fiber by conventional means. The resulting polymer fiber is capable of shifting the wavelength of the electromagnetic radiation from approximately 250 nm to 420 nm.

EXAMPLE 7

A wavelength shifting composition which has a more narrow wavelength shift is prepared according to the protocol in Example 6 except that 7 g of piperonal was used in the starting step. The resulting polymer fiber is capable of shifting the wavelength of the electromagnetic radiation from 250 nm to 400 nm.

EXAMPLE 8

Wavelength shifting composition for shifting from ultraviolet electromagnetic radiation to visible radiation A second wavelength shifting composition capable of shifting ultraviolet electromagnetic radiation to visible radiation is prepared by the following protocol. 0.5 g of 4-4'-methoxy biphenyl piperidine-N-oxide is dissolved in 40 mL of tetrahydrofuran (THF). 0.25 µL of 2.1 mM ethyl chloroformate is stirred vigorously into the solution at 20° C. for 20 minutes. After the polymerization step, the solution is cooled to −50° C. Nineteen mL of a 2.28 mM (in THF) anisyl magnesium bromide solution is added to above. The solution is maintained at −50° C. and stirred for 5 minutes and then is cooled to −70° C. for 30 minutes. The solution is then warmed gradually to 20°C. The solution is titrated slowly with 5 mL of methanol. The resulting mixture is filtered and the retained yellow powder is dried by evaporation.

A solution is prepared by dissolving 10 g of methoxymethyl p-tolyl ether in 20 mL of THF. The solution is cooled to −60° C. About 2.8 to 3.0 mL of 2 mM n-butyllithium in hexane is added to the solution and mixed for 30 minutes. The solution is gradually warmed to room temperature and is purged with nitrogen. 1.3 g of $MgBr_2$ is added to the solution and stirred for 0.5 hr. Then 190 mg of the yellow powder is added to the methoxymethyl p-tolyl ether solution and is heated to 25° C. for 2 hr. This solution is then added to conventional fiber optic polymers and fiber optic cable is prepared. The resulting fiber optic cable is capable of shifting the wavelength of ultraviolet radiation to visible radiation.

EXAMPLE 9

An additive that can be added to polymethylmethacrylate sheets, films or gels is prepared by mixing 20 mL of distilled 3-bromomethyl thiophene with 5 g of methoxy ethanol ethoxide. To this mixture 1 g CuO in 5 mL of 10% KI in ethanol is added. The solution is stirred at 110° C. for 3 hr. The resulting solution is filtered and dried under vacuum. The resulting powder is then added to conventional methylmethacrylate and initiators to produce a plastic sheet with a thickness of 100 µm to 2 mm. The plastic sheet is capable of shifting a wavelength from 250 nm to 400 nm.

EXAMPLE 10

Add 1 mole of OH-terminated biphenol polycarbonate to 1.05–2 moles of Cl-terminated siloxane in THF with different tertiary amines. It also can be polymerized by adding the latter to OH-terminated polycarbonates with alkoxy-function siloxanes with alcoholic splitting.

Other reagents can be used by replacing pyridine in the initial reaction of the halide-terminated organosiloxane (bromine- ,and fluorine-terminated organosiloxanes may also be used) and dihydric phenol with readily and completely removeable ammonia.

To increase flexibility (for a rubber-like fiber optics guide), polymerize as before diphenylolpropane bis- chlorobromate with Cl-terminated organosiloxane.

EXAMPLE 11

Method of making a wavelength frequency shifter of 200 nm to 700 nm.

Add 1.0 g (2.59 mmoles) dialdehyde and 1.82 g (2.6 mmoles) bis(phosphiylsulfide) (AGFA) to 25 mL of 0.5 g LiCl in dimethyl formamide (DMF). Using a syringe, add dropwise 15 mL of a 1 M potassium tert-butoxide solution in THF. After 6 hr of stirring, add 25 mL of 5% aqueous HCl; dry under reduced pressure. Dissolve the dried powder in chloroform and wash twice in 2% HCl and then 4 times in pure water and dry in a desiccator and then precipitate in absolute ethanol.

While not wanting to be bound by the following statement, it is believed that this copolymer changes the linkage links. The side chain position can be changed by varying the amount of the dialdehyde and by adding small amounts of terephthalaldehydes to the first solution.

It should be understood, of course, that the foregoing relates only to preferred embodiments of the present invention and that numerous modifications or alterations may be made therein without departing from the spirit and the scope of the invention.

I claim:

1. A method of preparing a graded index preform rod comprising:
  introducing at least two prepolymer compositions with different refractive indices into a polymerization vessel; and
  causing a controlled polymerization of the prepolymer compositions so that the resulting graded index preform rod has a refractive index profile.

2. The method of claim 1, wherein the controlled polymerization is by controlling rate of temperature change.

3. A method of increasing the clarity of a polymer composition comprising adding to the polymer composition an effective amount of a free radical scavenger.

4. The method of claim 3, wherein the free radical scavenger is dibutyl-1-phthalate.

5. The method of claim 1, wherein the controlled polymerization is achieved by varying relative percentages of the prepolymer compositions.

6. The method of claim 1, wherein the prepolymer compositions are selected from the group consisting of polycarbonates, polyesters, polyolefins, acrylic polymers, thermoplastic polymers, halide-terminated organosiloxanes, alkoxyfunctional siloxanes with an alcoholic split, hydroxy-terminated polymer borates, dihydric phenol with readily removable ammonia groups, diphenol propane bischloroformate, dodecylmercaptan, thiophene, butyl thiophene, aniline, dimethylaniline, styrene, methacrylate, methyl methacrylate, 2,2,2-trifluoroethyl methacrylate and 2,2,2-trifluoroethyl acrylate.

7. The method of claim 5, wherein the prepolymer compositions comprise methylmethacrylate and styrene and the relative percentage of methylmethacrylate to styrene is between 10% and 500%.

8. The method of claim 5, wherein the prepolymer compositions comprise methylmethacrylate and styrene and the relative percentage of methylmethacrylate to styrene is between 40% and 400%.

9. The method of claim 5, wherein the prepolymer compositions comprise methylmethacrylate and styrene and the relative percentage of methylmethacrylate to styrene is between 80% and 400%.

10. The method of claim 5, wherein the prepolymer compositions comprise methylmethacrylate and styrene and the relative percentage of methylmethacrylate to styrene is approximately 400%.

11. The method of claim 6 further comprising an additive selected from the group consisting of N,N-dimethylaniline, tetrabutyl ammonium fluoride tetrahydrate, mercuric-2-chloride, mercurate chloride and mercuric oxide.

12. The method of claim 11, wherein the prepolymer compositions comprise methylmethacrylate and styrene and the relative percentage of methylmethacrylate to styrene to is between 40% and 400%, and the tetrabutyl ammonium fluoride tetrahydrate is in 5% to 15% methylmethacrylate.

13. The method of claim 11, wherein the tetrabutyl ammonium fluoride tetrahydrate is in 5% to 15% methanol, and the mercuric-2-chloride is in a concentration of approximately 0.5% to 1.0% in 5% to 15% methanol.

14. A method of increasing the clarity of the preform rod of claim 1, comprising adding to the mixture an effective amount of a free radical scavenger.

15. The method of claim 14, wherein the free radical scavenger is selected from the group consisting of dibutyl-1-phthalate, propanol, cyclohexane, butylnitrile, and low temperature glass transition molecules.

16. The method of claim 14, wherein the effective amount of the free radical scavenger is approximately 0.01% to 2% by weight of the mixture.

17. The method of claim 14, wherein the effective amount of the free radical scavenger is approximately 0.1% to 1% by weight of the mixture.

18. The method of claim 14, wherein the effective amount of the free radical scavenger is approximately 0.5% by weight.

19. The method of claim 2, wherein the rate of temperature change is an increase of approximately 10° C. per 30 minutes until the temperature is approximately 100° C., followed by an increase of 30° C.

20. The method of claim 6, wherein 2,2,2-trifluoroethyl methacrylate or 2,2,2-trifluoroethyl acrylate is added in an amount of approximately 1% to 20% by weight.

21. A method of preparing a graded index preform rod comprising:

inserting a cylinder of cladding polymer into a reaction chamber;

adding into the cylinder a mixture comprising one or more prepolymer compositions having different refractive indices;

continuously adding an initiator to the chamber during addition of the prepolymer compositions;

varying relative percentages of prepolymer compositions while adding the prepolymer compositions to the mixture;

heating and rotating the chamber; and causing a controlled polymerization of the prepolymer compositions so that the resulting graded index preform rod has a refractive index profile.

22. The method of claim 21, wherein the cladding polymer comprises a prepolymer composition with a refractive index that is lower than the refractive index of the prepolymer composition added into the cylinder.

23. The method of claim 21, further comprising addition of a wavelength shifting additive to the mixture.

24. The method of claim 1, further comprising addition of a wavelength shifting additive to the mixture.

25. The method of claim 21, wherein the prepolymer compositions are selected from the group consisting of polycarbonates, polyesters, polyolefins, acrylic polymers, thermoplastic polymers, halide-terminated organosiloxanes, alkoxyfunctional siloxanes with an alcoholic split, hydroxy-terminated polymer borates, dihydric phenol with readily removable ammonia groups, diphenol propane bischloroformate, dodecylmercaptan, thiophene, butyl thiophene, aniline, dimethylaniline, styrene, methacrylate, methyl methacrylate, 2,2,2-trifluoroethyl methacrylate and 2,2,2-trifluoroethyl acrylate.

26. A preform rod made by the process of claim 1.

27. A preform rod made by the process of claim 21.

28. The method of claim 21, wherein the controlled polymerization is achieved by controlling rate of temperature change.

29. The method of claim 28, wherein the rate of temperature change is an increase of approximately 10° C. per 30 minutes until the mixture temperature is approximately 100° C., followed by an increase of 30° C.

* * * * *